United States Patent
Anderberg et al.

(10) Patent No.: US 12,206,838 B2
(45) Date of Patent: Jan. 21, 2025

(54) VIEW-INDEPENDENT MULTI-CAMERA VOLUMETRIC CAPTURE SYSTEM

(71) Applicants: Sony Group Corporation, Tokyo (JP); Sony Pictures Entertainment, Inc., Culver City, CA (US)

(72) Inventors: Tobias Anderberg, Los Angeles, CA (US); David Bailey, Los Angeles, CA (US)

(73) Assignees: Sony Group Corporation, Tokyo (JP); Sony Pictures Entertainment, Inc., Culver City, CA (US)

(*) Notice: Subject to any disclaimer, the term of this patent is extended or adjusted under 35 U.S.C. 154(b) by 490 days.

(21) Appl. No.: 17/484,264

(22) Filed: Sep. 24, 2021

(65) Prior Publication Data
US 2023/0101991 A1    Mar. 30, 2023

(51) Int. Cl.
*H04N 13/388* (2018.01)
*G06T 19/00* (2011.01)
*H04N 13/243* (2018.01)

(52) U.S. Cl.
CPC ......... *H04N 13/388* (2018.05); *G06T 19/006* (2013.01); *H04N 13/243* (2018.05); *G06T 2207/10021* (2013.01)

(58) Field of Classification Search
None
See application file for complete search history.

(56) References Cited

U.S. PATENT DOCUMENTS

| | | |
|---|---|---|
| 9,573,062 B1 | 2/2017 | Long et al. |
| 10,771,763 B2 | 9/2020 | Zavesky et al. |
| 10,951,879 B2 | 3/2021 | Besley |
| 2012/0098925 A1 | 4/2012 | Dasher et al. |
| 2014/0300602 A1* | 10/2014 | Nam ............ H04N 13/243 345/426 |
| 2018/0197324 A1 | 7/2018 | Kaisha |

(Continued)

FOREIGN PATENT DOCUMENTS

| | | |
|---|---|---|
| CN | 112150575 A | 12/2020 |
| EP | 1480450 A2 | 11/2004 |

(Continued)

OTHER PUBLICATIONS

International Search Report in PCT/US2022/013418, Federal Institute of Industrial Property, May 5, 2022, 2pgs.

*Primary Examiner* — Randolph I Chu
(74) *Attorney, Agent, or Firm* — Procopio, Cory, Hargreaves & Savitch LLP

(57) ABSTRACT

Reducing data used during capture in a physical capture volume by selectively activating image capture devices from a virtual view, including: setting up a virtual camera to receive information about and visualize the physical capture volume and a plurality of image capture devices in the virtual view; providing, to the virtual camera, the virtual view of the physical capture volume with a capability to move around the physical capture volume and activate or deactivate each of the plurality of image capture devices; calculating a view frustum, wherein the view frustum is a region of 3-D space within the physical capture volume that would appear on a view screen of the virtual camera; and defining the view frustum of the virtual camera which intersects with the plurality of image capture devices defined in the virtual view.

20 Claims, 6 Drawing Sheets

(56) References Cited

U.S. PATENT DOCUMENTS

| | | | |
|---|---|---|---|
| 2018/0367709 A1 | 12/2018 | Takama | |
| 2019/0174122 A1* | 6/2019 | Besley | H04N 13/243 |
| 2019/0364265 A1 | 11/2019 | Matsunobu | |
| 2020/0184710 A1* | 6/2020 | Besley | G06T 19/00 |
| 2020/0388073 A1 | 12/2020 | Mall | |
| 2021/0035354 A1* | 2/2021 | Williams | G01B 11/303 |
| 2021/0134058 A1* | 5/2021 | Ito | G06T 7/194 |
| 2021/0266511 A1* | 8/2021 | Ogasawara | G06T 1/20 |
| 2021/0383172 A1* | 12/2021 | Gruber | G06N 3/04 |
| 2022/0139027 A1* | 5/2022 | Luo | G06T 15/205 |
| | | | 345/418 |

FOREIGN PATENT DOCUMENTS

| | | |
|---|---|---|
| EP | 3586269 A1 | 1/2020 |
| EP | 3668093 A1 | 6/2020 |
| WO | 2018164852 A1 | 9/2018 |
| WO | 2018112498 A1 | 6/2020 |

* cited by examiner

ND MULTI-CAMERA
VIEW-INDEPENDENT MULTI-CAMERA VOLUMETRIC CAPTURE SYSTEM

BACKGROUND

Field

The present disclosure relates to processing and capturing video data, and the ability to re-frame already captured performances without having to do a full capture of new data.

Background

A volumetric capture system generally requires use of multiple cameras in order to capture the subject with full coverage. Thus, the system can potentially end up capturing a lot of redundant data depending on how the captured subject is to be used. Further, any changes in the camera settings, such as focal length, may necessitate recapture of the entire performance and all the data associated with each camera.

SUMMARY

The present disclosure provides for reducing the data used during capture by selectively activating cameras from a virtual view, and enabling reframing of already captured data without having to re-capture new data.

In one implementation, a system to reduce data used during capture using a virtual camera is disclosed. The system includes: a visual display to display a visual representation of the virtual camera; a processor to control the visual representation of the virtual camera; a volumetric capture system in communication with the processor and the visual display, wherein the volumetric capture system includes a plurality of image capture devices, wherein the virtual camera provides a birds-eye-view and a capability to activate or deactivate each of the plurality of image capture devices, wherein the virtual camera receives information about and visualizes the volumetric capture system and the plurality of image capture devices in the virtual world.

In one implementation, the plurality of image capture devices is arranged in a dome-like structure. In one implementation, the virtual camera further provides a capability to move around the dome-like structure. In one implementation, the virtual camera has a number of settings associated with it including aperture, focal length, focus, and other device parameters. In one implementation, the processor includes data about each of the plurality of image capture devices. In one implementation, the processor is configured to calculate a view frustum which is a region of 3-D space within the volumetric capture system that would appear on a view screen.

In another implementation, a method for reducing data used during capture in a physical capture volume by selectively activating image capture devices from a virtual view is disclosed. The method includes: setting up a virtual camera to receive information about and visualize the physical capture volume and a plurality of image capture devices in the virtual view; providing, to the virtual camera, the virtual view of the physical capture volume with a capability to move around the physical capture volume and activate or deactivate each of the plurality of image capture devices; calculating a view frustum, wherein the view frustum is a region of 3-D space within the physical capture volume that would appear on a view screen of the virtual camera; and defining the view frustum of the virtual camera which intersects with the plurality of image capture devices defined in the virtual view.

In one implementation, the method further includes arranging the plurality of image capture devices in a dome-like structure surrounding the physical capture volume. In one implementation, the method further includes arranging the plurality of image capture devices sequentially on posts. In one implementation, the virtual camera has a number of associated settings including aperture, focal length, focus, and other device parameters. In one implementation, defining the view frustum includes defining the view frustum using the number of associated settings on the virtual camera. In one implementation, the method further includes activating only devices of the plurality of image capture devices that are intersected by the virtual view frustum. In one implementation, the method further includes deactivating devices of the plurality of image capture devices that are not intersected by the virtual view frustum.

In a further implementation, a non-transitory computer-readable storage medium storing a computer program to reduce data used during capture in a physical capture volume by selectively activating image capture devices from a virtual view is disclosed. The computer program includes executable instructions that cause a computer to: setup a virtual camera to receive information about and visualize the physical capture volume and a plurality of image capture devices in the virtual view; provide, to the virtual camera, the virtual view of the physical capture volume with a capability to move around the physical capture volume and activate or deactivate each of the plurality of image capture devices; calculate a view frustum, wherein the view frustum is a region of 3-D space within the physical capture volume that would appear on a view screen of the virtual camera; and define the view frustum of the virtual camera which intersects with the plurality of image capture devices defined in the virtual view.

In one implementation, the computer-readable storage medium further includes executable instructions that cause the computer to arrange the plurality of image capture devices in a dome-like structure surrounding the physical capture volume. In one implementation, the computer-readable storage medium further includes executable instructions that cause the computer to arrange the plurality of image capture devices sequentially on posts. In one implementation, the virtual camera has a number of associated settings including aperture, focal length, focus, and other device parameters. In one implementation, the executable instructions that cause the computer to define the view frustum includes executable instructions that cause the computer to define the view frustum using the number of associated settings on the virtual camera. In one implementation, the computer-readable storage medium further includes executable instructions that cause the computer to activate only devices of the plurality of image capture devices that are intersected by the virtual view frustum. In one implementation, the computer-readable storage medium further includes executable instructions that cause the computer to deactivate devices of the plurality of image capture devices that are not intersected by the virtual view frustum.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, a conventional volumetric capture system having multiple cameras may end up capturing a lot of redundant data and any changes in the camera settings may necessitate recapture of the entire performance and all the data associated with each camera.

Certain implementations of the present disclosure provide for systems and methods of reducing the data used during capture by selectively activating cameras from a virtual view, and enabling reframing of already captured data without having to re-capture new data.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1A:
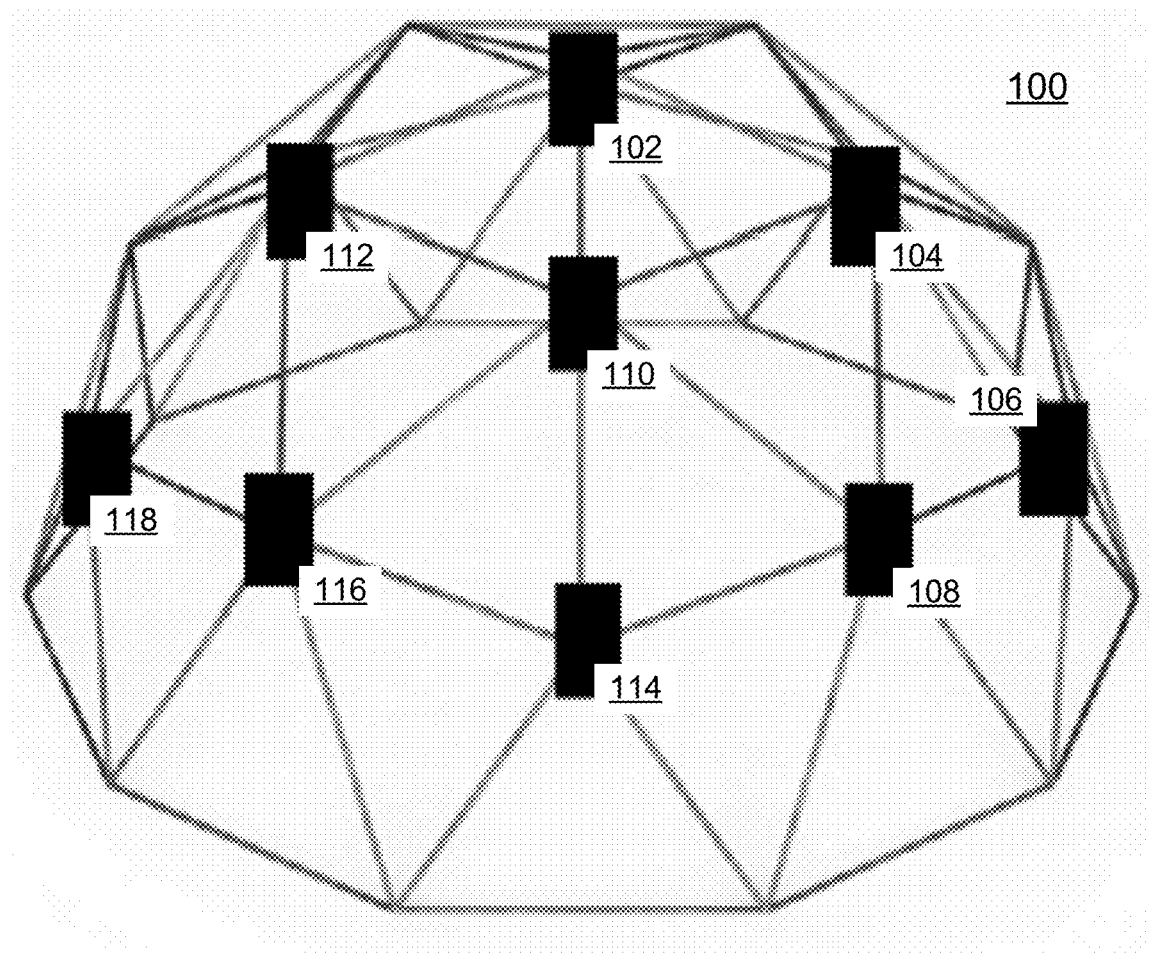
FIG. 1A is a diagram of a volumetric capture system 100 including a plurality of image capture devices in accordance with one implementation of the present disclosure.

FIG. 1A is a diagram of a volumetric capture system 100 including a plurality of image capture devices 102-118 in accordance with one implementation of the present disclosure. In the illustrated implementation of FIG. 1A, the plurality of image capture devices 102-118 is arranged in a dome-like structure within which is a capture volume. In another implementation, the plurality of image capture devices 102-118 is arranged sequentially on posts. In a further implementation, any and all combinations of arrangements of the plurality of image capture devices 102-118 are used. In one implementation, an image capture device is a video camera having a lens.

Figure 1B:
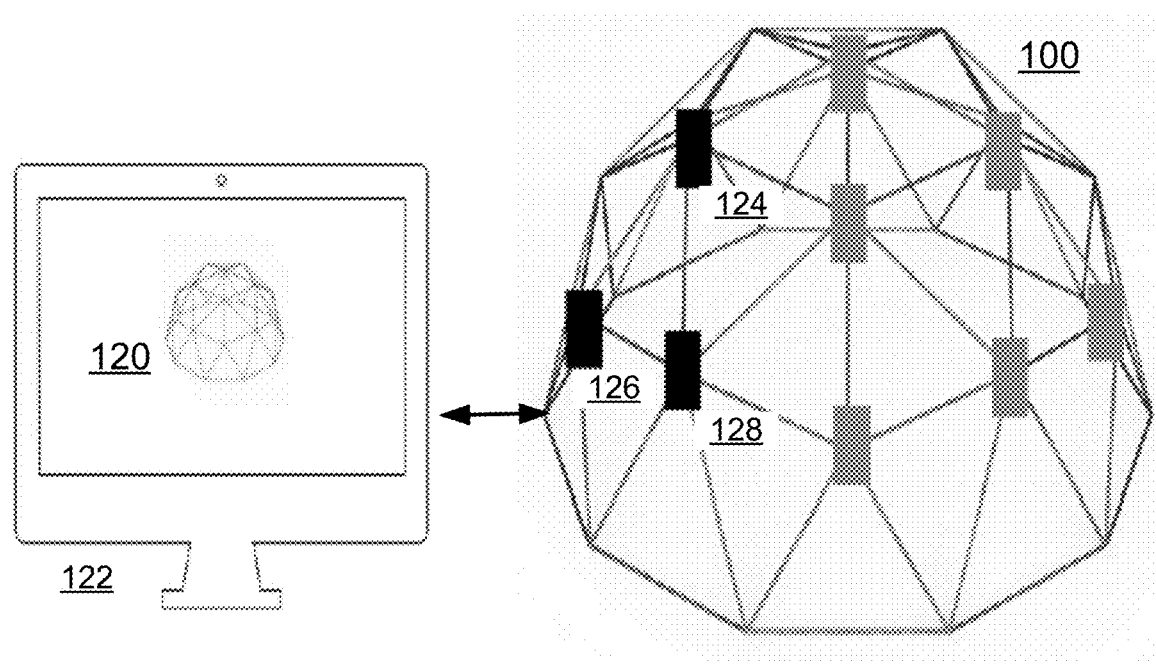
FIG. 1B is a diagram of the volumetric capture system in communication with a virtual camera in accordance with one implementation of the present disclosure.

FIG. 1B is a diagram of the volumetric capture system 100 in communication with a virtual camera 120 in accordance with one implementation of the present disclosure. In the illustrated implementation of FIG. 1B, the virtual camera 120 is configured in a personal computer 122 or similar device such as a tablet computer, which is used to control the virtual camera 120.

In one implementation, the virtual camera 120 provides a birds-eye-view of the volumetric capture system 100 with a capability to move around the system 100 and activate or deactivate each of the plurality of image capture devices. The virtual camera 120 has a number of settings associated with it including aperture, focal length, focus, and other device parameters such as lens distortion and image sensor format.

In the illustrated implementation of FIG. 1B, the virtual camera 120 receives information about the physical volumetric capture system 100 and visualizes the capture system 100 and the physical cameras in the virtual world.

To do this, the computer 122 (which controls the virtual camera 120) is in communication with the capture system 100 and has data about each of the plurality of image capture devices within the system 100. In one implementation, the computer 122 initially calculates a view frustum which is a region of 3-D space within the capture volume that would appear on a view screen. Thus, the view frustum would only include a region that would appear on a view screen (of a game, movie, etc.). Regions that would not appear on a view screen would not be included in the view frustum.

In one implementation, the settings on the virtual camera 120 define a view frustum of the camera 120, which intersects with the physical cameras defined in the virtual scene. In one example, only those physical cameras 124, 126, 128 that are intersected by the virtual view frustum will be activated for capture. Thus, in this example, other physical cameras are deactivated for capture. Depending on the type of capture that is being performed, this could greatly reduce the number of physical cameras actually used while still getting enough coverage, thereby greatly reducing the amount of data that is captured.

Figure 1C:
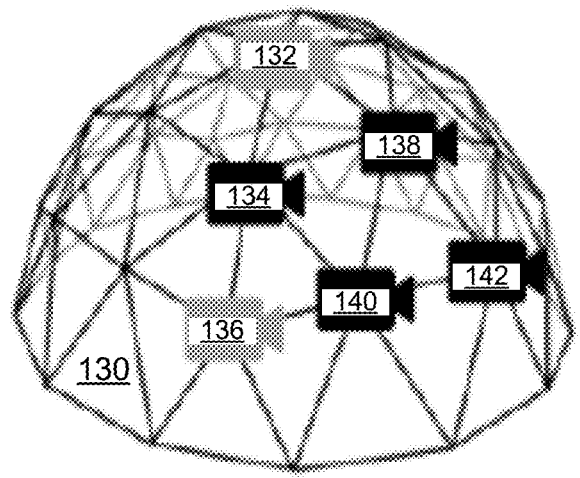
FIG. 1C shows a physical capture space, e.g. a dome, represented in a virtual 3-D world viewport (e.g., in a game) in accordance with one implementation of the present disclosure.

FIG. 1C shows a physical capture space, e.g. a dome, represented in a virtual 3-D world viewport 130 (e.g., in a game) in accordance with one implementation of the present disclosure. In this virtual 3-D viewport 130 there is a virtual camera, which depending on lens parameters (focal length, etc.), has a view frustum of a certain size. This view frustum intersects with virtual representations of the physical image capture devices 132-142 depending on the view directions of the virtual cameras. These intersections determine which physical image capture devices (e.g., image capture devices 134, 138, 140, 142) of the total physical image capture devices 132-142 actually capture any image data.

In one implementation, each of the physical image capture devices (e.g., image capture devices 132-142 in FIG. 1C) includes a large enough image sensor (e.g., a full frame sensor) and a wide enough lens to capture the entire scene of the capture system. Thus, the physical image capture devices (each device having a large image sensor and wide lens) provide the ability to digitally crop the image to a different focal length. For example, the scene can be cropped from 24 mm to 35 mm or 50 mm while still retaining enough pixel information so as not to degrade the image quality. The data is always captured in full resolution with widest lens settings. Therefore, by using the virtual camera 120 and changing the camera and lens parameters accordingly, the already-captured data can be re-processed to use different parameters. For example, the data can be re-processed to use a different focal length to change the framing of the already-captured data. Accordingly, by moving the virtual camera 120 to intersect with other physical cameras from the original capture, it is possible to effectively do a "re-shoot" using different viewing angle than what was used in the original capture without physically re-capturing the physical scene.

Figure 1D:
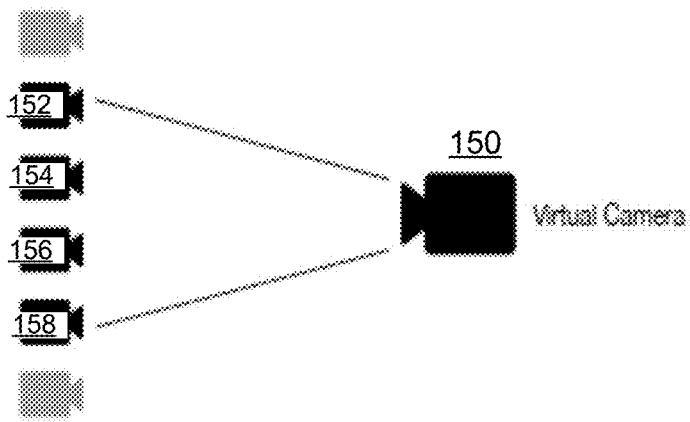
FIG. 1D shows a virtual camera (through which a user looks at the scene) which intersects with cameras defined in the virtual space.

FIG. 1D shows a virtual camera 150 (through which a user looks at the scene) which intersects with cameras defined in the virtual space. Cameras 152-158 represent the cameras activated for capture in the physical capture space represented in the virtual 3-D world viewport 130.

Figure 1E:
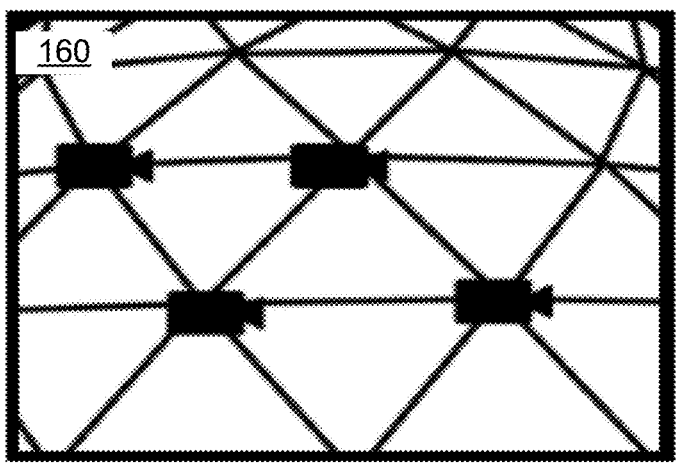
FIG. 1E is a view of the virtual camera and what the camera is intersecting.

FIG. 1E is a view 160 of the virtual camera 150 and what the camera 150 is intersecting. This is effectively looking through the lens of the virtual camera 150 in the 3-D viewport 130 of the application that controls the system.

Figure 2:
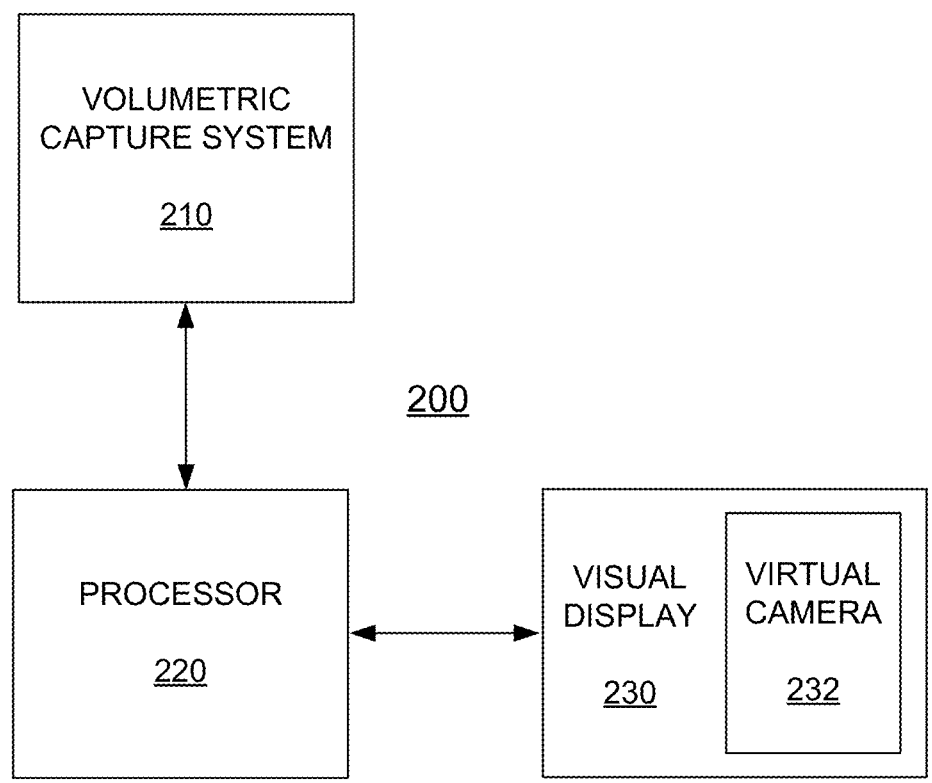
FIG. 2 is a block diagram of a system for reducing data used during capture in accordance with one implementation of the present disclosure.

FIG. 2 is a block diagram of a system 200 for reducing data used during capture in accordance with one implementation of the present disclosure. In the illustrated implementation of FIG. 2, the system 200 includes a volumetric capture system 210 in communication with a processor 220 and a visual display 230. In one implementation, the visual display 230 displays a visual representation of a virtual camera 232. In one implementation, the display of the virtual camera 232 is controlled by the processor 220 residing in a personal computer or similar device such as a tablet computer.

In one implementation, the volumetric capture system 210 includes a plurality of image capture devices arranged in a dome-like structure. In one implementation, the virtual camera 232 provides a birds-eye-view of the volumetric capture system 210 with a capability to move around the system 210 and activate or deactivate each of the plurality of image capture devices. The virtual camera 232 has a number of settings associated with it including aperture, focal length, focus, and other device parameters.

In the illustrated implementation of FIG. 2, the virtual camera 232 receives information about the physical volumetric capture system 210 and visualizes the capture system 210 and the physical cameras in the virtual world. To do this, the processor 220 (which controls the display of the virtual camera 232 on the visual display 230) is in communication with the capture system 210 and has data about each of the plurality of image capture devices within the system 210. In one implementation, the processor 220 calculates a view frustum which is a region of 3-D space within the capture volume that would appear on a view screen. Thus, the view frustum would only include a region that would appear on a view screen (of a game, movie, etc.). Regions that would not appear on a view screen would not be included in the view frustum.

In one implementation, the settings on the virtual camera 232 define a view frustum of the camera 232, which intersects with the physical cameras defined in the virtual scene. In one example, only those physical cameras that are intersected by the virtual view frustum will be activated for capture. Thus, in this example, other physical cameras are deactivated for capture. Depending on the type of capture that is being performed, this could greatly reduce the number of physical cameras actually used while still getting enough coverage, thereby greatly reducing the amount of data that is captured.

In one implementation, the system 200 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 200 is configured with a combination of hardware and software.

Figure 3:
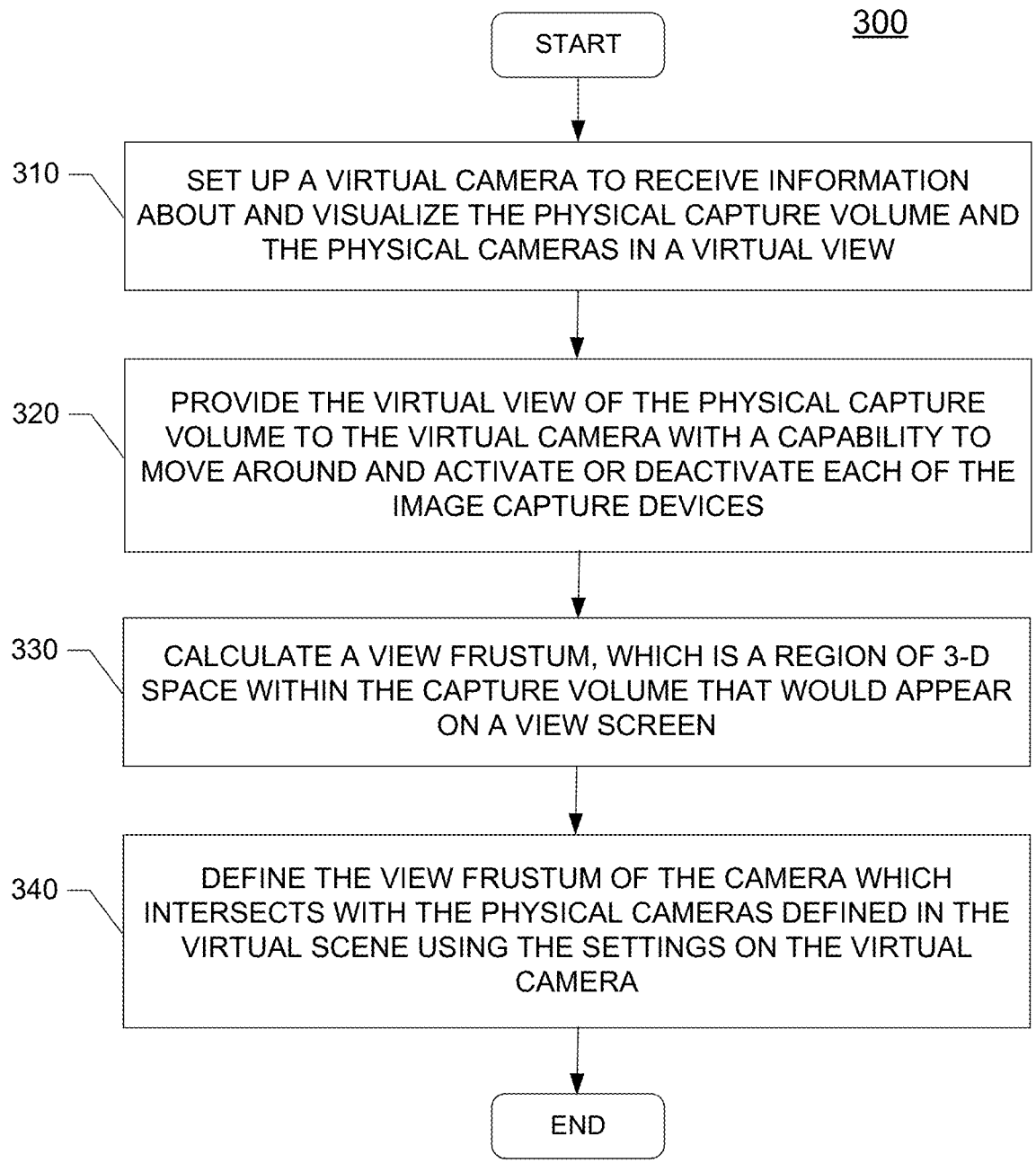
FIG. 3 is a flow diagram of a method for reducing data used during capture in a physical capture volume by selectively activating image capture devices from a virtual view, and enabling reframing of already-captured data without having to re-capture new data in accordance with one implementation of the present disclosure.

FIG. 3 is a flow diagram of a method 300 for reducing data used during capture in a physical capture volume by selectively activating image capture devices from a virtual view, and enabling reframing of already-captured data without having to re-capture new data in accordance with one implementation of the present disclosure. To do this, a plurality of image capture devices is arranged in a dome-like structure surrounding a physical capture volume. In another implementation, the plurality of image capture devices is arranged sequentially on posts. In a further implementation, any and all combinations of arrangements of the plurality of image capture devices are used. In one implementation, an image capture device is a video camera having a lens.

In the illustrated implementation of FIG. 3, a virtual camera is setup, at step 310, to receive information about and visualize the physical capture volume and a plurality of image capture devices in the virtual view. In one implementation, the virtual view (e.g., a birds-eye view) of the physical capture volume is provided to the virtual camera, at step 320, with a capability to move around the volume and activate or deactivate each of the plurality of image capture devices. The virtual camera has a number of settings associated with it including aperture, focal length, focus, and other device parameters.

In one implementation, a view frustum, which is a region of 3-D space within the capture volume that would appear on a view screen of the virtual camera, is calculated, at step 330. Thus, the view frustum would only include a region that would appear on a view screen (of a game, movie, etc.). Regions that would not appear on a view screen would not be included in the view frustum. The view frustum of the virtual camera which intersects with the physical image capture devices defined in the virtual view is defined, at step 340, using the settings on the virtual camera. In one example, only those physical cameras that are intersected by the virtual view frustum will be activated for capture. Thus, in this example, other physical cameras are deactivated for capture. Depending on the type of capture that is being performed, this could greatly reduce the number of physical cameras actually used while still getting enough coverage, thereby greatly reducing the amount of data that is captured.

Figure 4A:
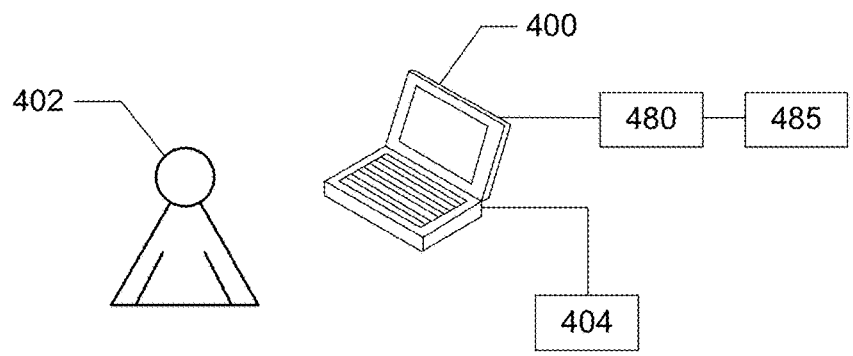
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement a virtual camera application 490 for reducing data used during capture as illustrated and described with respect to the system 200 in FIG. 2 and the method 300 in FIG. 3.

Figure 4B:
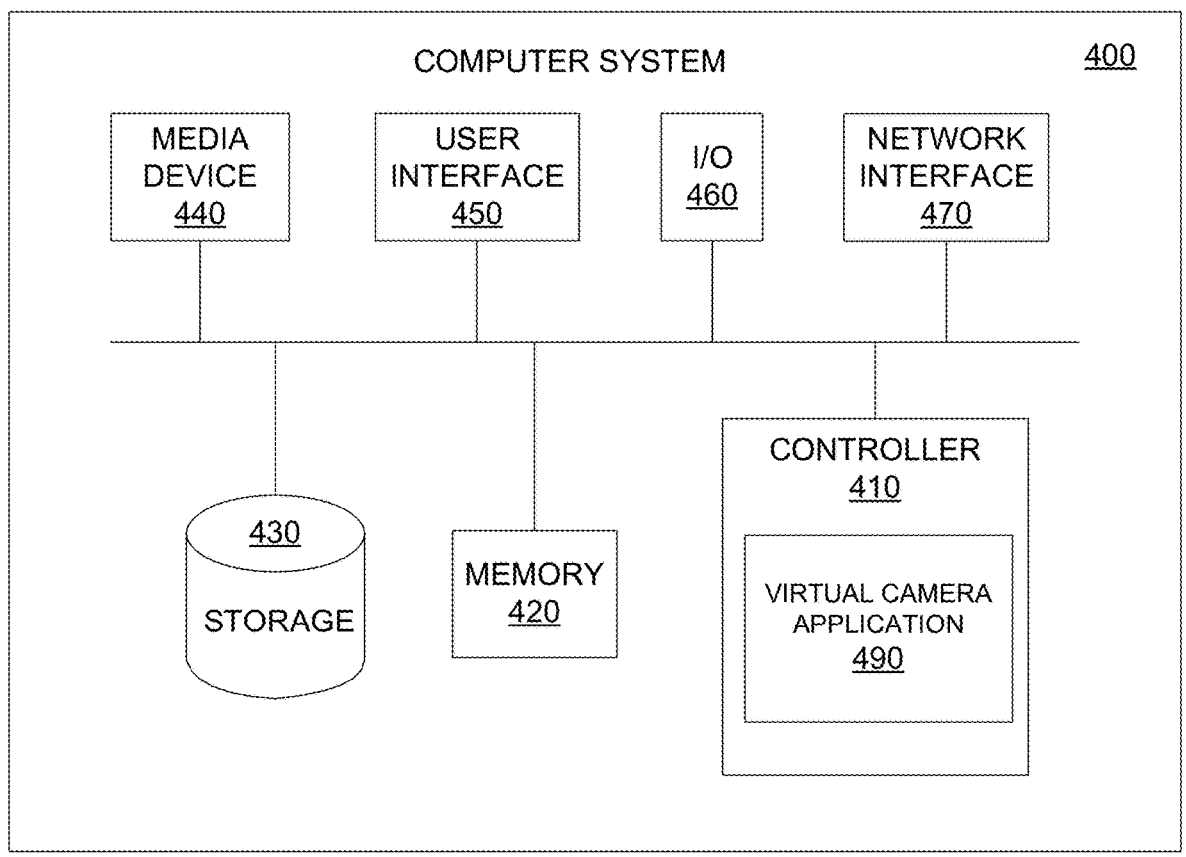
FIG. 4B is a functional block diagram illustrating the computer system hosting the virtual camera application in accordance with an implementation of the present disclosure.

The computer system 400 stores and executes the virtual camera application 490 of FIG. 4B. In addition, the computer system 400 may be in communication with a software program 404. Software program 404 may include the software code for the virtual camera application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the virtual camera application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the virtual camera application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the virtual camera application 490 with a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the virtual camera application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system to reduce data used during capture using a virtual camera in a physical capture volume, the system comprising:
   a visual display to display a visual representation of the virtual camera;
   a processor to control the visual representation of the virtual camera;
   a volumetric capture system in communication with the processor and the visual display,
   wherein the volumetric capture system includes a plurality of image capture devices,
   wherein the virtual camera provides a birds-eye-view and a capability to move around the physical capture volume and activate or deactivate each of the plurality of image capture devices,
   wherein the capability to activate or deactivate includes selectively activating at least one of the plurality of image capture devices from a virtual view to reduce data used during the capture,
   wherein selectively activating includes calculating a view frustum which is a region of 3-D space within the capture volume that would appear on a view screen of the virtual camera,
   wherein the virtual camera receives information about and visualizes the volumetric capture system and the plurality of image capture devices in the virtual world.

2. The system of claim 1, wherein the plurality of image capture devices is arranged in a dome-like structure.

3. The system of claim 2, wherein the virtual camera further provides a capability to move around the dome-like structure.

4. The system of claim 1, wherein the virtual camera has a number of settings associated with it including aperture, focal length, focus, and other device parameters.

5. The system of claim 1, wherein the processor includes data about each of the plurality of image capture devices.

6. The system of claim 1, wherein the processor is configured to calculate the view frustum which is a region of 3-D space within the volumetric capture system that would appear on the view screen.

7. A method of reducing data used during capture in a physical capture volume, the method comprising:
   setting up a virtual camera to receive information about and visualize the physical capture volume and a plurality of image capture devices in the virtual view;
   providing, to the virtual camera, a virtual view of the physical capture volume with a capability to move around the physical capture volume and activate or deactivate each of the plurality of image capture devices,
   wherein the capability to activate or deactivate includes selectively activating at least one of the plurality of image capture devices from the virtual view to reduce data used during the capture;
   calculating a view frustum, wherein the view frustum is a region of 3-D space within the physical capture volume that would appear on a view screen of the virtual camera; and defining the view frustum of the virtual camera which intersects with the plurality of image capture devices defined in the virtual view, wherein the virtual camera receives information about and visualizes the physical capture volume and the plurality of image capture devices.

8. The method of claim 7, further comprising arranging the plurality of image capture devices in a dome-like structure surrounding the physical capture volume.

9. The method of claim 7, further comprising arranging the plurality of image capture devices sequentially on posts.

10. The method of claim 7, wherein the virtual camera has a number of associated settings including aperture, focal length, focus, and other device parameters.

11. The method of claim 10, wherein defining the view frustum includes defining the view frustum using the number of associated settings on the virtual camera.

12. The method of claim 7, further comprising activating only devices of the plurality of image capture devices that are intersected by the virtual view frustum.

13. The method of claim 7, further comprising deactivating devices of the plurality of image capture devices that are not intersected by the virtual view frustum.

14. A non-transitory computer-readable storage medium storing a computer program to reduce data used during capture in a physical capture volume, the computer program comprising executable instructions that cause a computer to:

setup a virtual camera to receive information about and visualize the physical capture volume and a plurality of image capture devices in the virtual view;

provide, to the virtual camera, a virtual view of the physical capture volume with a capability to move around the physical capture volume and activate or deactivate each of the plurality of image capture devices, wherein the capability to activate or deactivate includes selectively activating at least one of the plurality of image capture devices from the virtual view to reduce data used during the capture;

calculate a view frustum, wherein the view frustum is a region of 3-D space within the physical capture volume that would appear on a view screen of the virtual camera; and define the view frustum of the virtual camera which intersects with the plurality of image capture devices defined in the virtual view, wherein the virtual camera receives information about and visualizes the physical capture volume and the plurality of image capture devices.

15. The computer-readable storage medium of claim 14, further comprising executable instructions that cause the computer to arrange the plurality of image capture devices in a dome-like structure surrounding the physical capture volume.

16. The computer-readable storage medium of claim 14, further comprising executable instructions that cause the computer to arrange the plurality of image capture devices sequentially on posts.

17. The computer-readable storage medium of claim 14, wherein the virtual camera has a number of associated settings including aperture, focal length, focus, and other device parameters.

18. The computer-readable storage medium of claim 17, wherein the executable instructions that cause the computer to define the view frustum includes executable instructions that cause the computer to define the view frustum using the number of associated settings on the virtual camera.

19. The computer-readable storage medium of claim 14, further comprising executable instructions that cause the computer to activate only devices of the plurality of image capture devices that are intersected by the virtual view frustum.

20. The computer-readable storage medium of claim 14, further comprising executable instructions that cause the computer to deactivate devices of the plurality of image capture devices that are not intersected by the virtual view frustum.

* * * * *